United States Patent [19]

Champagne et al.

[11] Patent Number: 4,805,061
[45] Date of Patent: Feb. 14, 1989

[54] SELF-POSITIONING WRITE PROTECT MECHANISM FOR A CARTRIDGE

[75] Inventors: Patrick J. Champagne, Cupertino, Calif.; David L. Rowden, Rochester, N.Y.

[73] Assignee: Verbatim Corp., Sunnyvale, Calif.

[21] Appl. No.: 60,127

[22] Filed: Jun. 9, 1987

[51] Int. Cl.[4] .................... G11B 23/02; G11B 15/04; G11B 19/04
[52] U.S. Cl. ...................................... 360/133; 360/60
[58] Field of Search ..................... 360/132, 136, 60

[56] References Cited

U.S. PATENT DOCUMENTS

| | | | |
|---|---|---|---|
| 4,041,537 | 8/1977 | Kishi | 360/60 |
| 4,507,692 | 3/1985 | Sasaki | 360/60 |
| 4,536,812 | 8/1985 | Oishi et al. | 360/133 |

*Primary Examiner*—John H. Wolff
*Attorney, Agent, or Firm*—Dennis P. Monteith

[57] ABSTRACT

A write protect mechanism is disclosed for a cartridge of the type having top and bottom plates and an information recording medium interposed therebetween. The write protect mechanism comprises a button visible through an aperture in one of the plates and slideably moveable in the aperture between a write protect position and a write enabled position. In the write protect position, an interfacing recording device is actuated to prevent recording so that information previously recorded on the disk will not be inadvertently erased. In the write enabled position, the recording device is actuated to record information on the disk. The button further has a flag adapted to extend into a gap in a rear peripheral wall joining the top and bottom plates to visibly indicate that the button is in the write protect position and that information can not be recorded on the medium. When the flag is retracted, this visibly indicates that recording, if not prevented, could inadvertently erase previously recorded information.

6 Claims, 3 Drawing Sheets

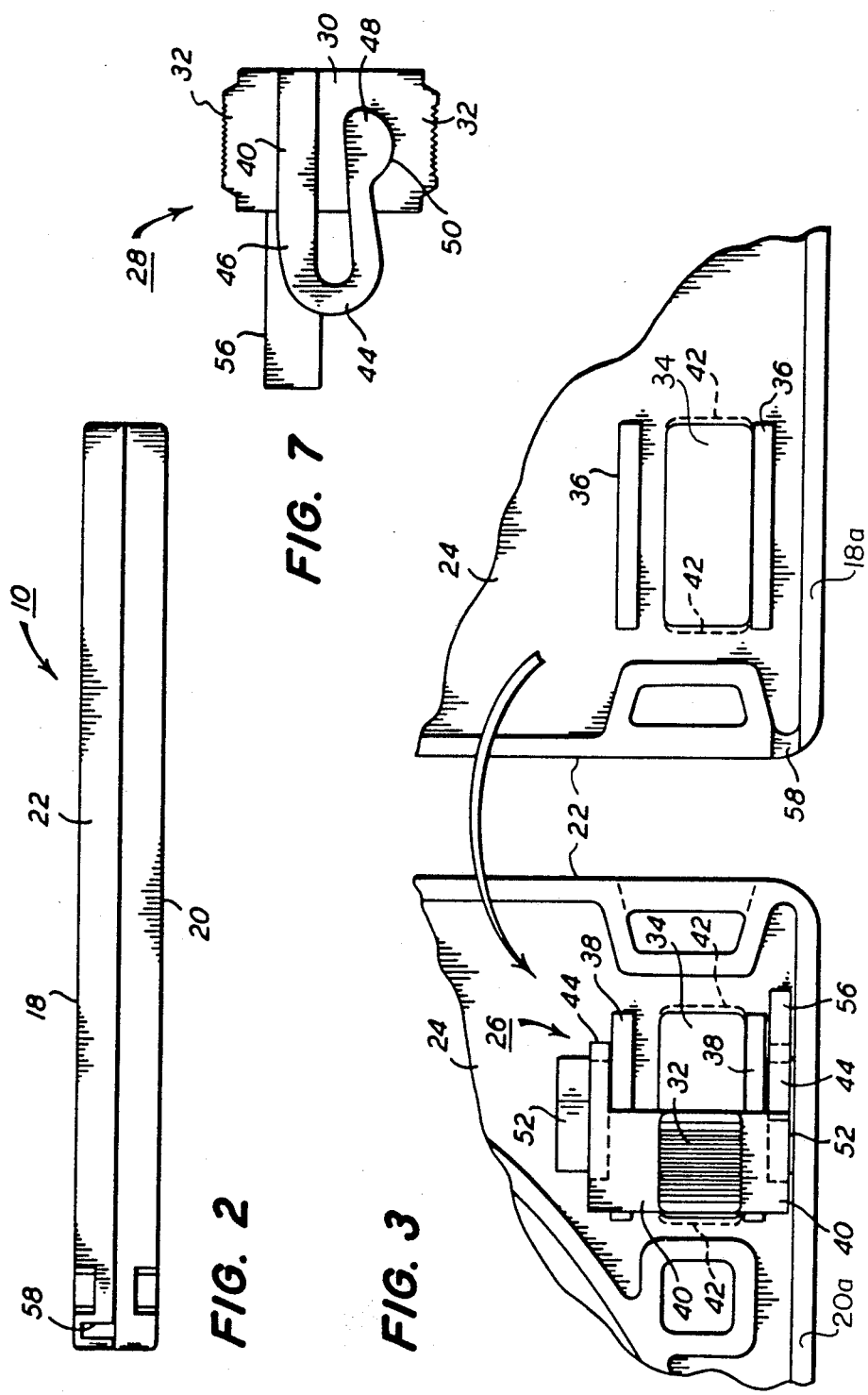

SELF-POSITIONING WRITE PROTECT MECHANISM FOR A CARTRIDGE

CROSS-REFERENCE TO RELATED APPLICATION

Reference is made to U.S. Pat. Application Ser. No. 059,999, entitled A Disk Cartridge by P. R. Ashe, J. R. Carey, P. J. Champagne and D. L. Rowden, filed on June 9, 1987.

1. Field Of The Invention

The present invention relates generally to cartridges containing an information recording medium, and more specifically to a cartridge write protect mechanism for indicating whether the cartridge is in a recording or non-recording condition.

2. Description Of The Prior Art

Cartridge write protect mechanisms for indicating whether the cartridge is in a write enabled (recording) position or a write protect (non-recording) position are well known in the art. For example, U.S. Pat. No. 4,409,630, which issued to Saito on Oct. 11, 1983, discloses a slideable member supported between upper and lower plates for preventing inadvertent erasure of the information signals from an information recording medium. The slideable member has a body portion provided with an extending finger formed by a slot. The finger has a projection at its free end to selectively seat in one of a pair of spaced notches upon movement of the slideable member between write protect and write enabled positions. In the write protect position, the interfacing recording device is prevented from recording so that a previous recording on the medium will not be inadvertently erased. In the write enabled position of the slideable member, the interfacing recording device will record information on a previously unrecorded medium.

An apparatus for preventing erasure of previously recorded material by placing the cartridge in a write protect position is disclosed in U.S. Pat. No. 4,460,930, which issued to Takahashi on July 17, 1984. The apparatus comprises a piece formed simultaneously with the disk cartridge cover by a molding process. The piece has a configuration which enables it to be slideably remounted to the disk cover after being torn off the cover.

U.S. Pat. No. 4,517,617, which issued to Tsuji, et al on May 14, 1985, discloses a cartridge having a channel shaped cut-out portion at a corner thereof. An erasure preventing piece at the corner is connected integrally with the cartridge through a thin portion formed by a V-shaped groove. The piece can be separated from the cartridge by pivoting it outwardly and breaking it off so that when the cartridge is placed in an interfacing recording device, it will not operate to inadvertently erase the previously recorded medium.

Still another cartridge recording or non-recording indicating mechanism is disclosed in U.S. Pat. No. 4,660,105 which issued to Harris et at on Apr. 21, 1987. In this patent, the cartridge indicating mechanism comprises a slideable insert having at least one flexible finger extending from the front surface thereof. The free end of the finger has a V-shaped projection adapted to flex over the apex of the side surface of a post and resiliently selectively engage the front or rear cam surfaces thereof. In the write enabled (recording) position, the insert is captured between an abutment means and the rear cam surface of the post for releasably holding the body portion thereof in register with and blocking an aperture. When the cartridge is mounted in a recording device, means therein interfacing with the cartridge mechanism is actuated by the blocked aperture to permit the recording of information on the medium. In the write protect (non-recording) position, the post is captured between the front surface of the body portion and the projection on the finger for releasably holding the body portion out of register with and unblocking the aperture. In this write protect position, the recording device interfacing means prevents operation of the recording device when the cartridge is mounted therein so that previously recorded information on the medium will not be inadvertently erased.

Although the aforementioned U.S. patents all disclose write protect mechanisms for indicating whether the cartridge is in a write enabled (recording) position or in a write protect (non-recording) position, a problem presented by their respective designs is that the write protect or write enabled positions are only visible from the top, bottom or side of the cartridge. Accordingly, once the cartridge has been inserted into a recording device, it is impossible to visually determine the write protect or write enabled condition of the cartridge without first removing it from the recording device.

Another problem with the prior known write protect mechanisms of the type that are alternately moveable between write protect and write enabled positions is that the mechanisms utilize a large amount of space within the cartridge enclosure.

In view of the aforementioned problems, a clear need exists in the disk cartridge art for a compact write protect mechanism that is of simple design and construction, thoroughly reliable in operation, economical to manufacture, and utilizes a minimal amount of enclosure space within the cartridge.

SUMMARY OF THE INVENTION

In view of the foregoing, an object of the present invention is to provide a write protect mechanism for a cartridge containing an information recording medium comprising:

two opposed spaced-apart top and bottom plates defining an enclosure in which the information recording medium is mounted, and a peripheral wall joining the top and bottom plates with a gap in the rear peripheral wall communicating with the enclosure, at least one of the top and bottom plates further having a write control aperture extending therethrough;

a button interposed between the top and bottom plates and slideably mounted within the write control aperture for movement between a write protect position and a write enabled position; and a flag on the button adapted when the button is in the write protect position to extend into the gap to visibly indicate to the operator that information can not be recorded on the information recording medium even when the cartridge is mounted in its recording position in a medium recording device.

In a more specific aspect of the invention, the button has a generally rectangular shaped body member having an end portion thereof extending into the write control aperture. The flag comprises a finger projecting outwardly from the body member in alignment with the cartridge gap. The write protect mechanism further comprises means for releasably holding the button in the write protect or write enabled positions. The holding means comprises a set of U-shaped flexible spring members each of which has one end portion thereof secured to the body member and a free end portion thereof engaging a ramp on one of the top and bottom plates. When the free end portion of the spring member is in engagement with one end of the ramp, the button is held in a write protect position, and when it is in engagement with the other end of the ramp, the button is held in its write enabled position.

A primary advantage of this invention is to provide an improved write protect mechanism for a cartridge that is compact and of simple design and construction for indicating whether information can or can not be recorded on the information recording medium in the cartridge. The write protect mechanism involves only one unitary moveable part, is thoroughly reliable in operation and economical to manufacture. In addition, the position of the write protect mechanism is readily observable, particularly when the cartridge is mounted within a recording device.

The invention and its advantages will become more apparent from the detailed description of the invention presented below.

BRIEF DESCRIPTION OF THE DRAWINGS

In a detailed description of the preferred embodiment of the invention presented below, reference is made to the accompanying drawings, in which:

FIG. 2 is a rear elevational view of the disk cartridge of FIG. 1;

FIG. 3 is a segmental top plan view of corner portions of the opposed top and bottom plates of the cartridge positioned 180° apart and within which the write protect mechanism of this invention is embodied;

FIG. 7 is a side elevational view of the button taken substantially from line 7—7 of FIG. 5 with the cartridge omitted for purposes of clarity.

DETAILED DESCRIPTION OF THE INVENTION

Figure 1:
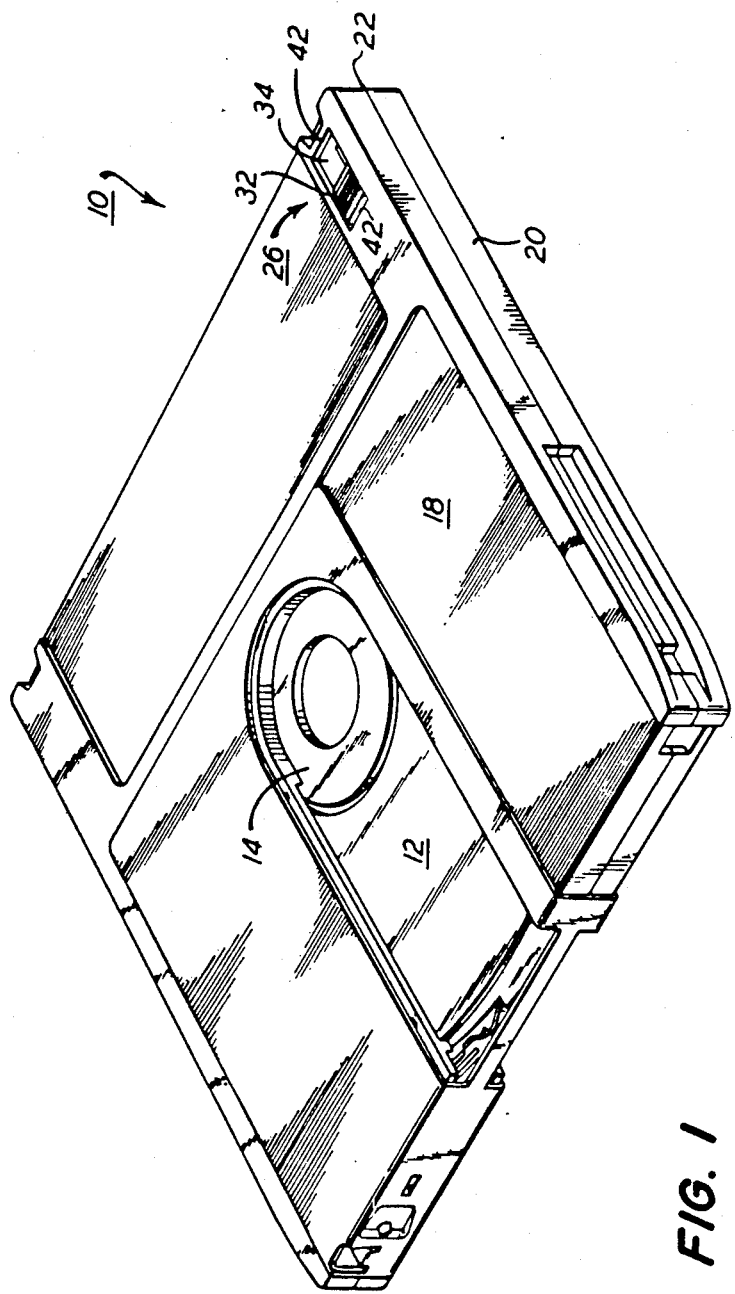
FIG. 1 is a top perspective view of a disk cartridge in which a preferred embodiment of the write protect mechanism of this invention is embodied, with the cartridge shutter mechanism in an open disk-uncovering position.

Referring to FIG. 1 of the drawings, a preferred embodiment of a write protect mechanism of this invention is shown incorporated in a disk cartridge 10. The cartridge 10 contains a disk 12 adapted for recording data on, and playing back data from, a plurality of concentric record tracks encircling a central spindle-drive region 14 of disk 12. It should be recognized that both single and double-sided recording may be employed, and that when double-sided recording is used, as is preferred for large-capacity data storage, both circular sides of disk 12 include a recording surface.

The cartridge 10 comprises a top plate 18 and an opposed bottom plate 20, as viewed in FIG. 1, composed of a material to provide structural rigidity. Preferably, both plates 18, 20 are plastic and are formed by a commercially available injection molding operation.

The top plate 18 and the bottom plate 20 are generally of a size to accommodate a disk of standard size, such as 3½ inch, 4¾ inch (compact disk), 5¼ inch, 8 inch or the like, to permit rotatable movement of disk 12 therebetween about a central axis of rotation. To that end, each plate 18, 20 has an integral peripheral lip 18a, 20a respectively (see FIG. 5), cooperatively forming a surrounding peripheral wall 22 which serves to space the lower surface of top plate 18 from the upper surface of bottom plate 20. Thus, peripheral wall 22, together with top plate 18 and bottom plate 20, define the outer dimensions of a generally enclosed compartment or enclosure 24 in which disk 12 is contained for rotatable movement. A write protect mechanism, indicated generally by reference numeral 26, is located near a corner of cartridge 10 where it does not interfere with disk 12.

The write protect mechanism 26 is designed to indicate to the user that information can or can not be recorded on one or both sides of disk 12 contained therein. If information can be recorded on both sides of disk 12, a pair of write protect mechanisms 26 may be provided, one for each side of the disk. Normally, during use, the write protect mechanism 26 is located in a normal write enabled (recording) position on cartridge 10 indicating that information can be recorded on disk 12. After recording, the user may manually move the write protect mechanism 26 to a write protect (non-recording) position which interfaces with a recording mechanism in a known way, as shown and described in U.S. Pat. No. 4,460,930, for example, to prevent recording which would erase the previously recorded information.

Figure 4:
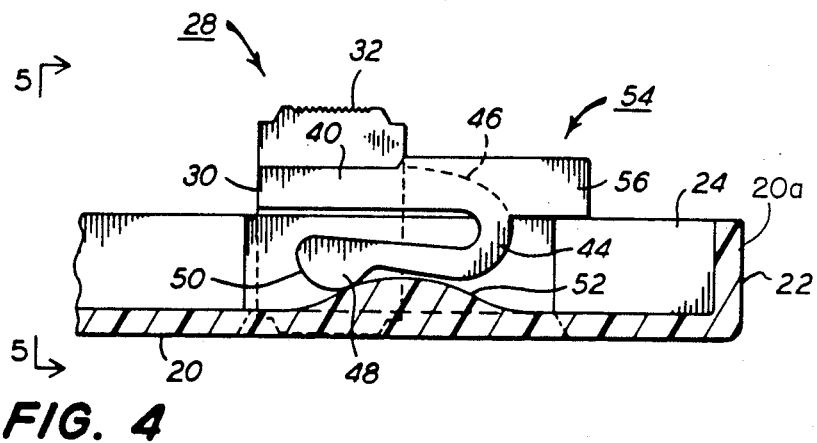
FIG. 4 is a section view taken substantially along line 4—4 of FIG. 5 showing the button in the write enabled position.
Figure 5:
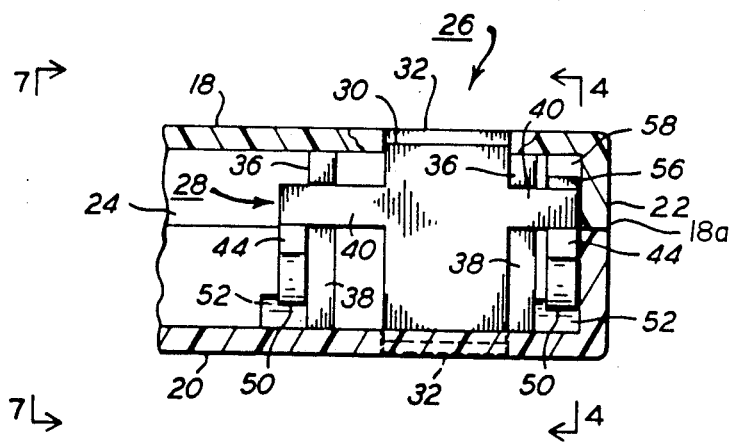
FIG. 5 is a view taken substantially along line 5—5 of FIG. 4 with the top plate also shown.

With reference to FIGS. 2-7, the write protect mechanism 26 comprises a button 28 having a substantially rectangular body member 30 having generally square shaped end portions 32 extending into and slideably moveable along generally rectangular write control apertures 34 in the top and bottom plates 18, 20. To facilitate slideable movement, the outer surface of end portions 32 may be striated. The top and bottom plates 18, 20 further have parallel depending rails 36, 38 respectively, as best seen in FIGS. 3 and 5, that engage opposite sides of laterally extending arms 40 on body member 30 for slideably guiding button 28 for movement between the write enabled position, shown in FIGS. 3 and 4, and the write protect position shown in FIG. 6. The write control apertures 34 are further provided with beveled ends 42 (FIGS. 1 and 3) to provide access to an edge of end portion 32 of button 28 by a sharp instrument or fingernail to facilitate movement of the button between the write protect and write enabled positions. Although the apertures 34 are located in opposed relation in the top and bottom plates 18, 20, it should be realized that only one aperture accommodating one end portion 32 would suffice. The opposite end portion 32 in such a modification would slide along the inner surface of the opposite plate.

Figure 6:
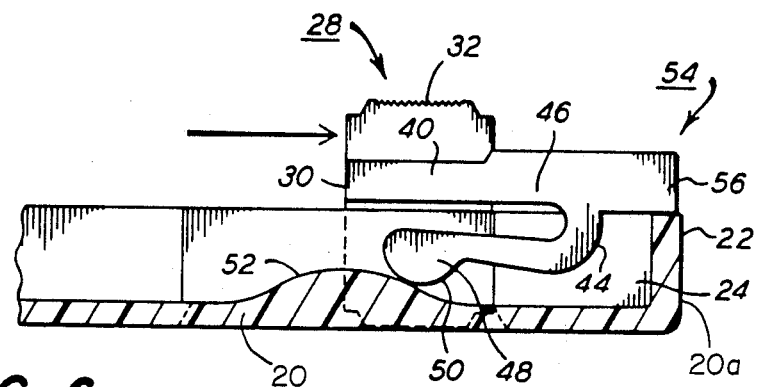
FIG. 6 is a view similar to FIG. 4 showing the button in the write protect position.

The write protect mechanism 26 is further provided with a holding means for releasably holding the write protect mechanism in its write protect and write enabled positions. The holding means comprise a pair of generally U-shaped spring fingers 44, each having one end portion 46 integral with an arm 40 of body member 30 and a free end portion 48 positioned in parallel and opposed relation to end portion 46. The free end portion 48 further has a lip 50 engageable with a curved ramp 52 on bottom plate 20. With lips 50 in engagement with one side of ramps 52, as best seen in FIGS. 4 and 5, end portions 32 of button 28 are pressed into engagement with one end of the write control apertures 34 for holding the write protect mechanism in its write enabled position. As button 28 is moved to the write protect position, as best seen in FIG. 6, a spring force builds as free end portions 48 of spring fingers 44 flex upwardly as they initially ride up the corresponding ramp 52. When lips 50 move just past the crown of the ramps 52, thereby engaging the opposite downwardly sloping surface of their respective ramps, the built-up spring force flexes the free end portion 48 of each spring finger 44 downwardly, thereby creating a toggle-like effect. This toggling action serves to move the body member 30 forward automatically, thereby forcing end portions 32 of button 28 against the opposite end of apertures 34. Due to the symmetry of each ramp 52, a similar toggle-like action occurs as button 28 is moved from its write protect position (FIG. 6) toward its write enabled position (FIG. 4).

The button 28 further has a flag 54 comprising a projection 56 integral with one arm 40 and projecting outwardly therefrom in a direction generally parallel to top and bottom plates 18, 20. The projection 56 is further aligned with a gap 58 at one end of the rear peripheral wall 22, as best seen in FIGS. 2 and 3. When button 28 is in the write protect position, the end of projection 56 extends through gap 58 and is clearly visible to the user indicating that information can not be recorded on the disk.

The button 28 is preferably formed from a plastic material that is a contrasting color to the cartridge so that opposite end portions 32 thereof and the end surface of projection 56 are all clearly visible to the cartridge user.

The positioning of button 28 and its interface with a detecting means, not shown, of a recording device, not shown, has been selected so that in the write protect position of the write protect mechanism 26, as seen in FIG. 6, recording is not possible, and in the write enabled position (see FIG. 4) it is possible to record information on the disk. However, it should be understood that the reverse is possible; that is, the detecting means and button position interface could be designed so that in the previous normal write enabled position recording is not possible thereby protecting previously recorded information, and in the previous write protect position recording is possible. With this latter type of design, the cartridge could be used with button 28 of write protect mechanism 26 in the position shown in FIG. 6 in which projection 56 is extended into gap 58, and this would indicate that the cartridge is in a normal recording position. Following recording, button 28 could be moved to a write protect position as seen in FIGS. 4 and 5.

The invention has been described in detail with particular reference to a preferred embodiment thereof, but it will be understood that variations and modifications can be effected within the spirit and scope of the invention.

What is claimed is:

1. A self-positioning write protect mechanism for a cartridge comprising opposed top and bottom plates spaced from each other to form a compartment arranged for writing data on, and reading data from, an enclosed information-receptive medium, said write protect mechanism comprising:
    (a) symmetrically shaped ramp-like projection means integral with an internal surface of at least one of said plates;
    (b) a body member mounted within said compartment for slidable movement along an operative path defined by (1) a first extreme write enabled position in which an associated drive mechanism is permitted to record data on the information-receptive medium, (2) a second extreme write protect position in which such drive mechanism is prevented from recording data on the information-receptive medium, and (3) an intermediate position adjacent the crown of said ramp-like projection means;
    (c) a button, coupled to said body member and accessible to a cartridge user through a write control aperture in at least one of said plates, for slideably moving said body member along its operative path (1) in a first direction from its write enabled position past its intermediate position toward its write protect position, and (2) in a second opposing direction from its write protect position past its intermediate position toward its write enabled position; and
    (d) holding means for releasably holding said body member either in its write protect position or in its write enabled position, said holding means comprising finger-like spring means having one end portion integral with said body member and a free end portion engageable with said ramp-like projection means as said body member is moved through its intermediate position, said finger-like spring means and said ramp-like projection means cooperatively producing a toggle-like action as said finger-like spring means moves past the crown of said ramp-like projection means the effect of which toggle-like action is to move said body member forward, either into its write enabled position or into its write protect position, as said spring means moves past the crown of said symmetrically shaped ramp-like projection means.

2. A write protect mechanism according to claim 1 wherein the information-receptive medium is a disk.

3. A write protect mechanism according to claim 1 wherein the write control aperture is substantially rectangular.

4. A write protect mechanism according to claim 3 wherein the write control aperture has beveled end surfaces to provide access to end surfaces of said button for moving said body member between the write protect and write enabled positions.

5. A write protect mechanism according to claim 1 wherein said cartridge includes a peripheral wall joining said top and bottom plates and defining a gap, and wherein said body member includes a flag comprising a projection projecting outwardly from said body member in alignment with the gap.

6. A write protect mechanism according to claim 5 wherein said top and bottom plates have spaced depending rails in register with one another and defining a space therebetween, said button has a generally rectangular body portion having a generally square end portion thereof extending into the write control aperture, said ramp-like projection means comprising a pair of curved spaced, parallel ramps on one of said top and bottom plates, said body member further having laterally extending arms slideably mounted in the space between said rails, said finger-like spring means comprising a pair of U-shaped flexible spring members, each having one end portion thereof secured to one of said arms and a free end portion of each spring member engaging a complementary ramp and adapted when in engagement with one end of said ramps to hold said body member in a write protect position, and when in engagement with the other end of said ramps to hold said body member in its write enabled position.

* * * * *